United States Patent
Draper et al.

(10) Patent No.: US 7,232,290 B2
(45) Date of Patent: Jun. 19, 2007

(54) DRILLABLE SUPER BLADES

(75) Inventors: Samuel D. Draper, Kohler, WI (US); William S. Kvasnak, Guilford, CT (US)

(73) Assignee: United Technologies Corporation, Hartford, CT (US)

( * ) Notice: Subject to any disclaimer, the term of this patent is extended or adjusted under 35 U.S.C. 154(b) by 187 days.

(21) Appl. No.: 10/871,163

(22) Filed: Jun. 17, 2004

(65) Prior Publication Data

US 2005/0281673 A1 Dec. 22, 2005

(51) Int. Cl.
*F01D 5/18* (2006.01)
(52) U.S. Cl. .................................... 416/97 R
(58) Field of Classification Search ........... 416/96 R, 416/97 R, 95
See application file for complete search history.

(56) References Cited

U.S. PATENT DOCUMENTS 5,752,801 A * 5/1998 Kennedy ................. 415/115
5,931,638 A * 8/1999 Krause et al. ............ 416/97 R
6,539,627 B2 * 4/2003 Fleck ....................... 29/889.72

* cited by examiner

Primary Examiner—Edward K. Look
Assistant Examiner—Devin Hanan
(74) Attorney, Agent, or Firm—Bachman & LaPointe

(57) ABSTRACT

A turbine engine component, such as a blade or a vane, is provided by the present invention. The turbine engine component has a pressure side and a suction side. Each of the pressure and suction sides has an external wall and an internal wall. A first set of fluid passageways is located on the pressure side between the external wall and the internal wall. A second set of fluid passageways is located on the suction side between the external wall and the internal wall. Each of the fluid passageways in the first set and in the second set has a wavy configuration. The turbine engine component may also have one or more wavy trailing edge cooling passageways for cooling a trailing edge portion of the component.

34 Claims, 3 Drawing Sheets

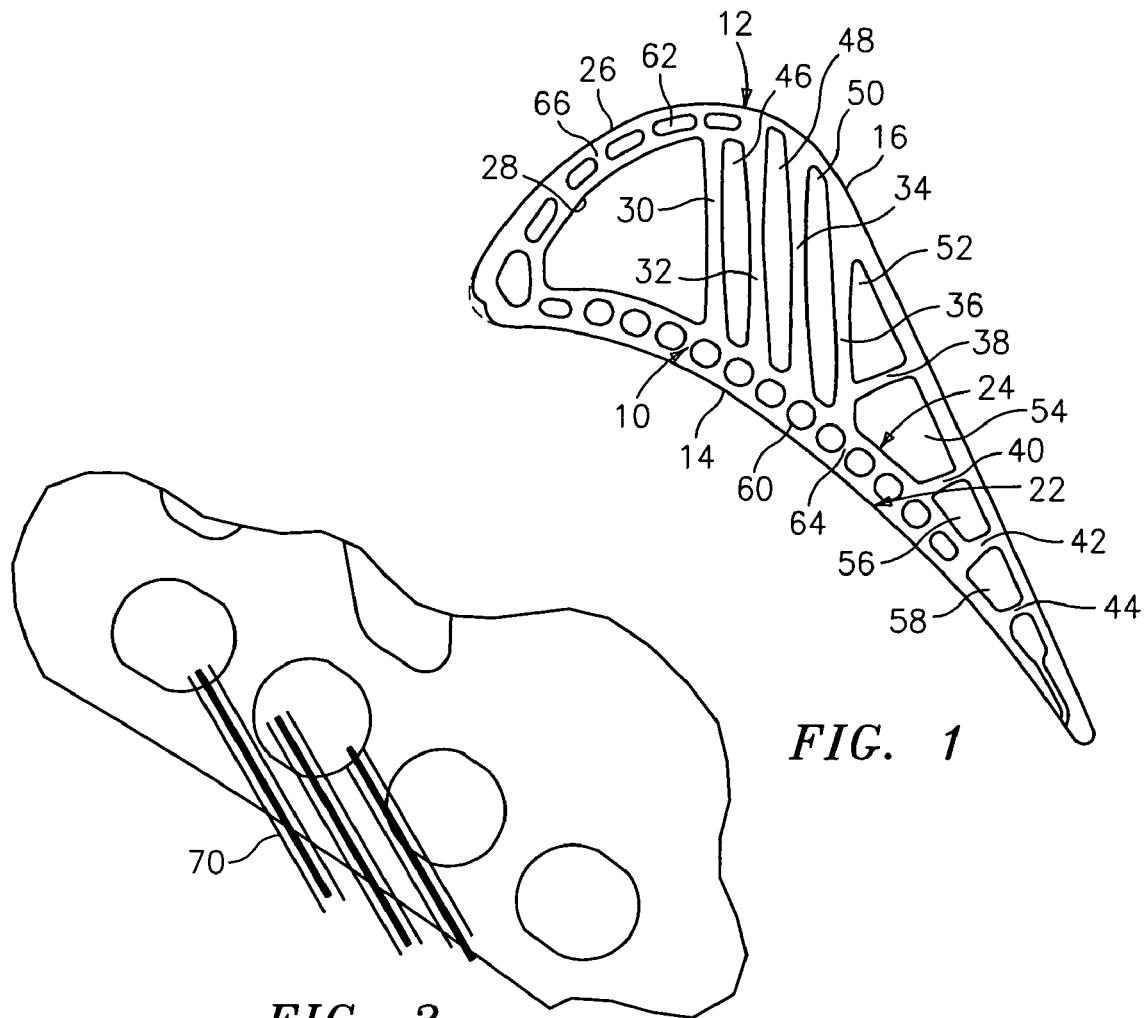
FIG. 1
FIG. 2
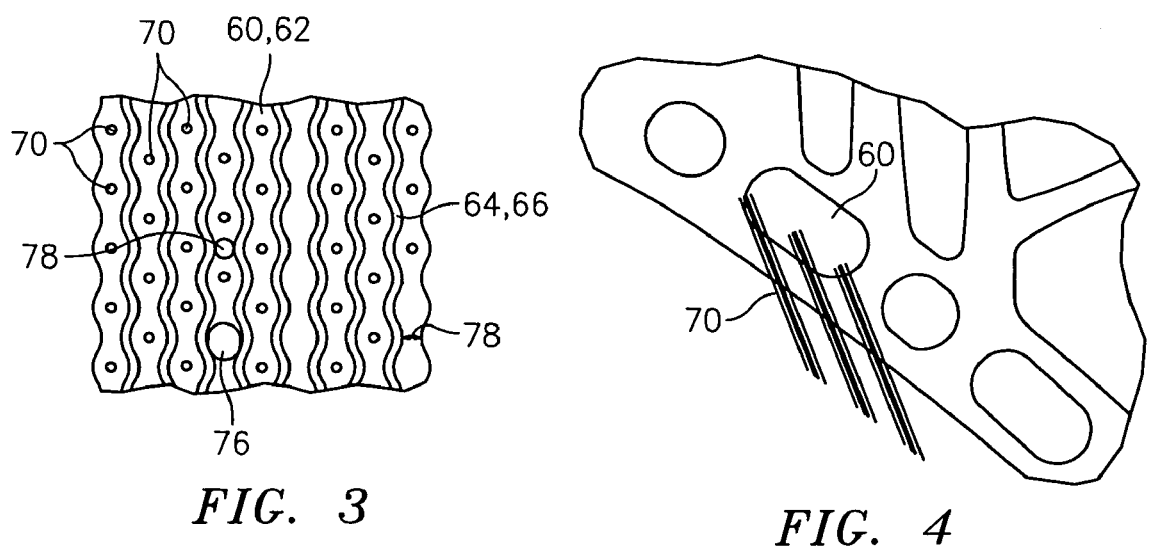
FIG. 3
FIG. 4

US 7,232,290 B2

DRILLABLE SUPER BLADES

STATEMENT OF GOVERNMENT INTEREST

The Government of the United States of America may have rights in the present invention as a result of Contract Nos. N00019-01-C-01 and F33615-95-C-2503.

BACKGROUND OF THE INVENTION (a) Field of the Invention

The present invention relates to an improved design for components used in gas turbine engines and to a method for manufacturing such components.

(b) Prior Art

Substantial effort has been invested in the development of blade cooling concepts. Much of the effort has focused on developing the manufacturing processes for casting the components and ensuring survivability against thermal mechanical fatigue (TMF). The solutions which have been developed to the TMF problem, and the inherent tolerances in casting, create a very difficult component to drill holes in.

SUMMARY OF THE INVENTION

Accordingly, it is an object of the present invention to provide a turbine engine component that has cooling passageways and drilled cooling film holes incorporated therein.

It is a further object of the present invention to provide a method for manufacturing a turbine engine component having cooling passageways and drilled cooling film holes.

It is still a further object of the present invention to provide a turbine engine component with improved trailing edge cooling.

The foregoing objects are attained by the turbine engine component and the manufacturing method of the present invention.

In accordance with the present invention, a turbine engine component has a pressure side and a suction side. Each of the pressure and suction sides has an external wall and an internal wall. A first set of fluid passageways is located on the pressure side between the external wall and the internal wall. A second set of fluid passageways is located on the suction side between the external wall and the internal wall. Each of the fluid passageways in the first set and in the second set are provided with a wavy configuration.

Further, in accordance with the present invention, a method for manufacturing a turbine engine component comprises the steps of casting a turbine engine component having a pressure side and a suction side, each with an external wall and an internal wall, a first set of wavy fluid passageways between the external wall and the internal wall on the pressure side, and a second set of wavy fluid passageways between the external wall and the internal wall on the suction side.

Still in accordance with another aspect of the present invention, a turbine engine component is provided having at least one trailing edge exit nozzle, and at least one wavy fluid passageway having an inlet for receiving a cooling fluid and communicating with the at least one exit nozzle. Each wavy fluid passageway preferably extends in a radial direction.

Other details of the drillable super blades of the present invention and the method of manufacturing same, as well as other objects and advantages attendant thereto, are described in the following detailed description and the accompanying drawings, wherein like reference numerals depict like elements.

BRIEF DESCRIPTION OF THE DRAWINGS

FIG. 1 is a mid span sectional view of a turbine engine component having a plurality of cooling passageways;

FIG. 2 illustrates a problem in drilling cooling holes solved by the present invention;

FIG. 3 is a sectional view of a portion of the turbine engine component showing cooling passageways in accordance with the present invention;

FIG. 4 illustrates a cooling passageway with a plurality of cooling film holes drilled therein;

DETAILED DESCRIPTION OF THE PREFERRED EMBODIMENT(S)

Figure 5:
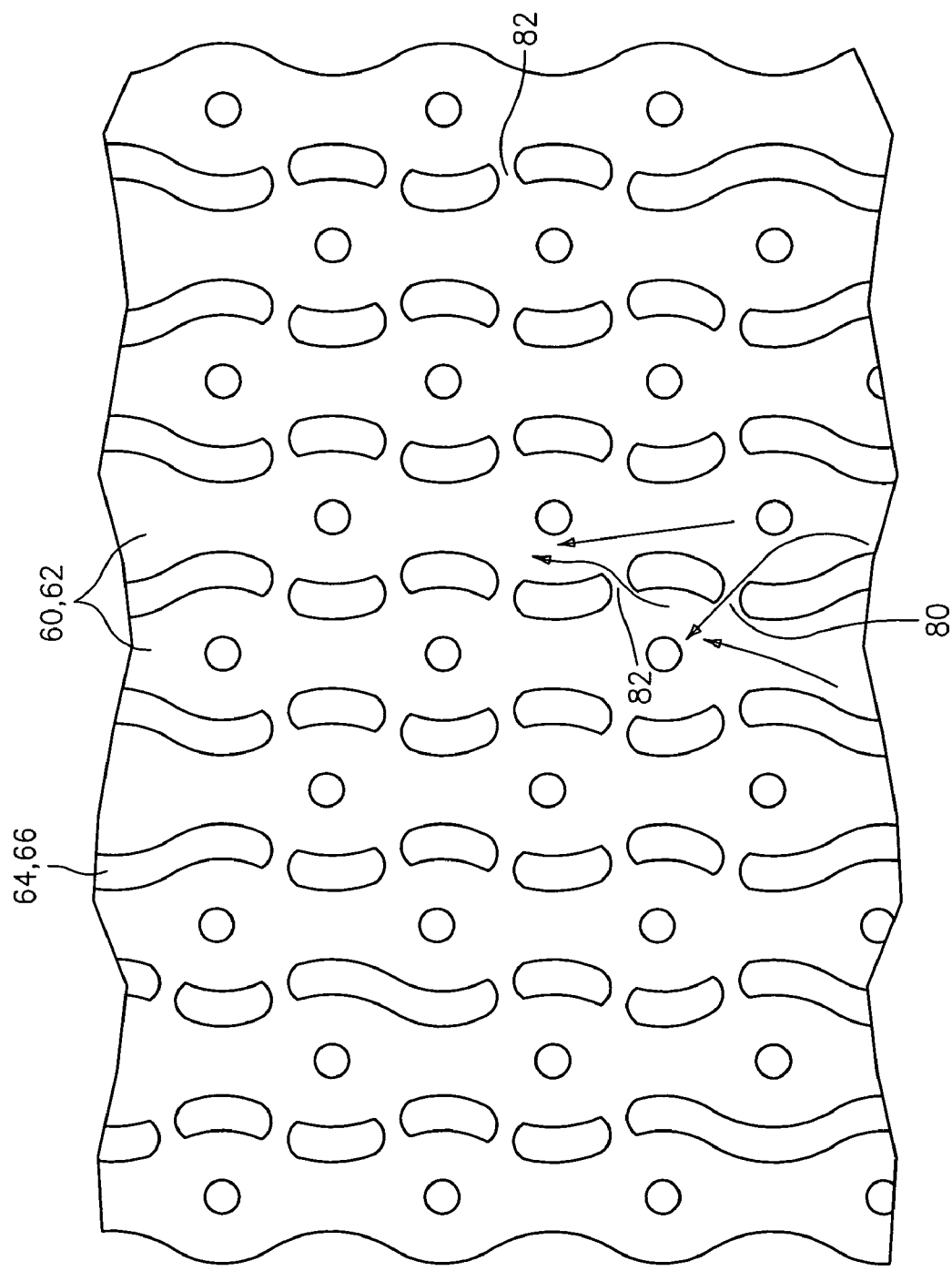
FIG. 5 illustrates a sectional view of an alternative embodiment of a portion of the turbine engine component.

Referring now to the drawings, FIG. 1 illustrates a turbine engine component 10, such as a turbine blade or a vane. The turbine engine component includes an airfoil portion 12 having a pressure side 14 and a suction side 16, both extending from a leading edge 18 to a trailing edge 20.

The turbine engine component 10 is cast so that the pressure side 14 of the airfoil portion 12 has an external wall 22 and an internal wall 24. Similarly, the turbine engine component 10 is cast so that the suction side 16 of the airfoil portion 12 has an external wall 26 and an internal wall 28. A plurality of ribs 30, 32, 34, 36, 38, 40, 42, and 44 define a plurality of internal cooling passageways 46, 48, 50, 52, 54, 56, and 58.

Still further, the turbine engine component 10 has a first set of cooling passageways 60 positioned between the walls 22 and 24 and a second set of cooling passageways 62 positioned between the walls 26 and 28. Adjacent ones of the cooling passageways 60 are separated by a non-linear rib 64 and adjacent ones of the cooling passageways 62 are separated by a non-linear rib 66. The ribs 64 create thermal conduction paths between the walls 22 and 24, while the ribs 66 create thermal conduction paths between the walls 26 and 28. The passageways 60 and 62 are each sized to reduce, and potentially eliminate, TMF problems.

Each of the cooling passageways 60 and 62 has at least one row, and preferably more than one row, of cooling film holes 70 drilled therein. In the past, as shown in FIG. 2, there has been a problem in drilling such cooling holes without contacting adjacent cooling passageways and without creating very long holes.

Referring now to FIGS. 3 and 4, there is shown a solution to the problem of drilling the cooling film holes 70. As shown therein, each of the ribs 64 and 66 is provided with a wavy configuration. As a result of this configuration, a widened area 76 is created in which the cooling film holes 70 may be drilled and a narrowed area 78 is created which helps improves the fatigue capability. As a result of this configuration, the passageways 60 and 62 have a wavy configuration and a radially varying thickness. In a preferred embodiment of the present invention, each of the passageways 60 and 62 have a thickness in the range of from 0.085 inches to 0.125 inches in the widened area 76 where the cooling film holes 70 are to be drilled. Also, in a preferred embodiment, the narrowed area 78 in each of the passageways 60 and 62 has a thickness in the range of from 0.055 to 0.065 inches. Further, in a preferred embodiment, the ribs 64 and 66 each have a thickness in the range of from 0.025 to 0.035 inches.

It has been found that there are a number of benefits to this arrangement. For example, the ribs 64 and 66 may still be sized to maintain pull and provide good TMF life. Additionally, a minimum channel width can be maintained for each passageway 60 and 62 for core injectability.

FIG. 4 illustrates how, using the wavy configuration of the present invention, the cooling film holes 70 can be drilled without contacting adjacent passageways 60, 62.

It also has been found that cooling holes 70 drilled in accordance with the present invention can be drilled without over-drilling and without creating under-flow. Further, with regard to thermal metal fatigue, components formed in accordance with the present invention have an interstitial life percentage of 150 percent.

The turbine engine component 10 with the airfoil portion 12, the pressure side 14, the suction 16, the external walls 22 and 26 and internal walls 24 and 28, and the other details enumerated above, including the wavy cooling passageways 60 and 62, may be formed using any suitable casting technique known in the art. Further, the turbine engine component 10 may be formed from any suitable material known in the art such as a nickel base superalloy, a cobalt based superalloy, and a titanium based superalloy. After the component 10 has been cast, one or more rows of cooling holes 70 may be drilled to communicate with each cooling passageway 60 and 62. Any suitable drilling technique known in the art, such as laser drilling, may be used to drill the cooling holes 70. The cooling holes 70 have a length which is determined by the particular turbine engine component being fabricated. Also, the angle of the cooling holes 70 relative to the external surface of the turbine engine component is a function of the particular component being fabricated.

Referring now to FIG. 5, in some situations, it may be necessary to eliminate regions where recirculation zones can be created. FIG. 5 illustrates two adjacent cooling passageways 60 and 62. As shown therein, the rib 64, 66 between adjacent ones of the passageways 60, 62 is provided with a series of breaks 80 and 82. The breaks 80 and 82 allow cooling fluid from one of the passageways 60, 62 to enter an adjacent one of the passageways 60, 62. By allowing cooling fluid to flow through the break 80, a potential recirculation zone in the widened region 76 can be avoided. By providing break 82, fluid from the passageway 60, 62 is allowed to flow into the adjacent passageway 60, 62. Due to the axial flow of cooling fluid in the adjacent passageway 60, 62, the cooling fluid which enters through break 82 is pressed against the common rib 64, 66. This enhances the cooling effect created by the passageways 60, 62.

Further, as can be seen in FIG. 5, the widened regions 76 of adjacent cooling passageways 60, 62 are offset. As a result, the cooling film holes 70 drilled into adjacent ones of the passageways 60, 62 are offset.

By using the wavy cooling passageway system of the present invention, better cooling of a turbine engine component can be effected. The wavy passageway system of the present invention can be used in a variety of portions of the turbine engine component 10.

Trailing edge portions of a turbine engine component are very difficult to cool because they need to be very thin and they have a high heat load. Suction side film creates shock losses and generates an aero loss. High convective cooling is required. A large pressure difference exists between the supply pressure and the exit pressure at the trailing edge allowing for high convective cooling. Convective cooling requires maximizing the quantity of heat transfer coefficient h and heat transfer area (hA) for the cooling passages.

Currently, a series of impingement cavities and connecting feeds are used to generate the high hA. The impingement cavities are required to get the heat transfer augmentation due to boundary layer restart in the connecting feeds. A trailing edge slot discharges the flow at the pressure side trailing edge. "h" is much higher in the connecting feeds and trailing edge slot than in the impingement cavities. This is because the cross sectional area is much smaller in the connecting feeds. The impingement cavities are thicker than the connection feeds and therefore require the blade trailing edge to be thicker, a driver in aero losses.

Figure 6:
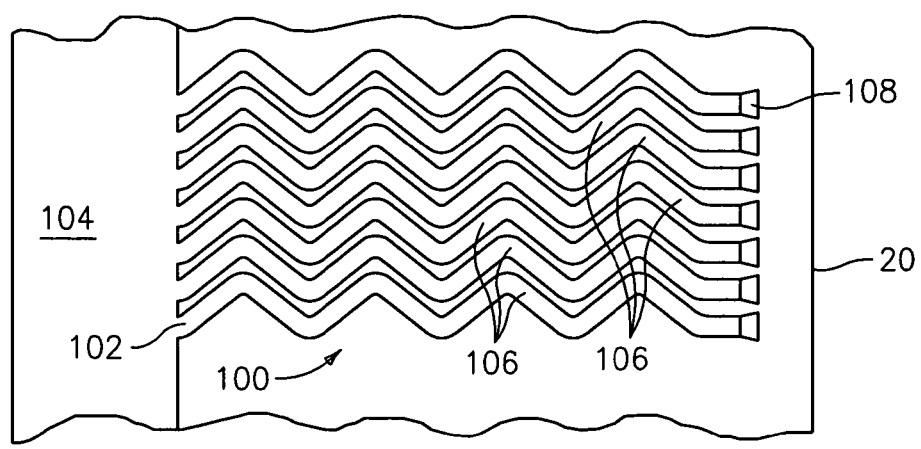
FIG. 6 is a schematic representation of a trailing edge portion of a turbine engine component.
Figure 7:
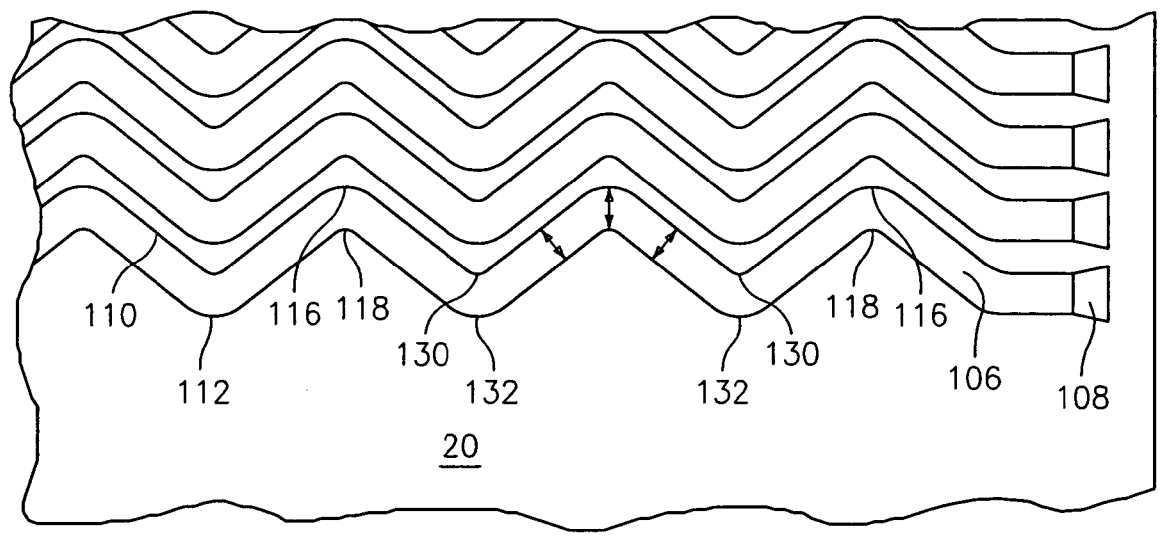
FIG. 7 is an enlarged view of a portion of the trailing edge portion of the turbine engine component.

FIGS. 6 and 7 illustrate a trailing edge cooling system 100 in accordance with another aspect of the present invention. The trailing edge cooling system 100 may be used in combination with the passageways 60 and 62. Alternatively, a turbine engine component may be fabricated which has the trailing edge cooling system 100 without the passageways 60 and 62.

As shown in FIGS. 6 and 7, the trailing edge 20 has a passageway 104 for receiving a cooling fluid from a source (not shown). The passageway 104 communicates with the inlet 102 of one or more fluid passageways 106 which terminate in one or more exit slots or nozzles 108 on the pressure side 14 of the trailing edge 20. Each of the fluid passageways 106 has a wavy configuration. By making the fluid passageways 106 wavy in a radial direction, the distance the cooling fluid travels in the trailing edge 20 increases, the convection area increases, and the heat transfer coefficient increases due to periodic boundary layer restart. This increases heat transfer to the trailing edge 20. The periodic boundary layer restart from the waves in the passageway(s) 106 eliminate the need for the impingement cavities.

As can be seen from FIGS. 6 and 7, each of the sidewalls 110 and 112 has periodically spaced peaks 116 and 118 and periodically spaced valleys 130 and 132. The peaks 116 and 118 and the valleys 130 and 132 may be spaced at any desired interval. The curvature of each passageway 106 between the peaks 116 and 118 and the valleys 130 and 132 should be such that it causes periodic boundary layer restart. For example, the curvature of each passageway 106 may be sinusoidal or substantially sinusoidal.

In order to achieve a desired level of cooling, it is important that the cooling fluid fill each passageway 106 and travel along a non-linear path. Thus, the sidewalls 110 and 112 must not be spaced apart by too great a distance. If they are spaced too far apart, the cooling fluid will flow in a straight line from the inlet 102 of the fluid passageway 106 to the exit slot 108. To avoid this, the cross sectional area between the peaks 116 and 118 must be no more than equal to the cross sectional area at the valleys 130 and 132 and less than the cross sectional area of any other section taken along the fluid passageway 106. For example, at sections 120 and 122, the cross sectional area is greater than the cross sectional area between the peaks 116 and 118.

The passageway 104, the passageway(s) 106, and the exit nozzle(s) 108 may be formed using any suitable technique known in the art. For example, the passageway 104 and the passageway(s) 106 may be formed by casting and the exit slots or nozzles 108 may be formed using a drilling technique. Alternatively, each of the aforementioned features may be formed using a casting technique.

It is apparent that there has been provided in accordance with the present invention drillable super blades which fully satisfy the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A turbine engine component comprising:
   a pressure side and a suction side;
   each of said sides having an external wall and an internal wall;
   a first set of fluid passageways located on said pressure side between said external wall and said internal wall;
   a second set of fluid passageways located on said suction side between said external wall and said internal wall;
   each of said fluid passageways in said first set and said second set have a wavy configuration; and
   a non-linear rib extending between adjacent ones of said fluid passageways.

2. A turbine engine component according to claim 1, further comprising at least one cooling film passageway extending between each said fluid passageway and said external wall.

3. A turbine engine component according to claim 1, further comprising a plurality of cooling film passageways extending between each said fluid passageway and said external wall.

4. A turbine engine component according to claim 1, wherein said at least one cooling film passageway is drilled substantially at a widest spacing between adjacent ones of said non-linear ribs.

5. A turbine engine component according to claim 4, wherein said widest spacing is in the range of from 0.085 to 0.125 inches.

6. A turbine engine component according to claim 1, wherein said non-linear rib is sized to maintain pull and to provide survivability against thermal mechanical fatigue.

7. A turbine engine component according to claim 1, wherein said at least one fluid passageway has a minimum width in the range of from 0.055 to 0.065 inches.

8. A turbine engine component according to claim 1, further comprising means for preventing recirculation zone creation in said fluid passageways.

9. A turbine engine component according to claim 1, further comprising:
   a trailing edge portion;
   at least one wavy cooling passageway in said trailing edge portion;
   said at least one wavy cooling passageway having an inlet for receiving a cooling fluid; and
   an exit nozzle for discharging said cooling fluid.

10. A turbine engine component according to claim 9, further comprising a plurality of wavy cooling passageways in said trailing edge portion.

11. A turbine engine component according to claim 9, wherein each of said wavy cooling passageways has a pair of spaced apart sidewalls and said sidewalls being spaced apart by a distance which allows cooling fluid to fill the cooling passageways and flow along a non-linear path.

12. A turbine engine component according to claim 11, wherein each said sidewall has a plurality of spaced apart peaks and a plurality of spaced apart valleys.

13. A turbine engine component according to claim 12, wherein each said passageway has a first cross sectional area between aligned ones of said peaks and a second cross sectional area in other regions of said passageway, and wherein said second cross sectional area is greater than said first cross sectional area.

14. A turbine engine component according to claim 9, wherein each said cooling passageway extends in a radial direction.

15. A turbine engine component comprising:
    a pressure side and a suction side;
    each of said sides having an external wall and an internal wall;
    a first set of fluid passageways located on said pressure side between said external wall and said internal wall;
    a second set of fluid passageways located on said suction side between said external wall and said internal wall;
    each of said fluid passageways in said first set and said second set having a wavy configuration;
    means for preventing recirculation zone creation in said fluid passageways;
    a non-linear rib separating adjacent ones of said fluid passageways; and
    said recirculation zone preventing means comprising said non-linear rib having a first break for permitting cooling fluid from a first fluid passageway to flow into an adjacent fluid passageway.

16. A turbine engine component according to claim 15, further comprising said non-linear rib having a second break spaced from said first break for allowing cooling fluid from said adjacent fluid passageway to flow into said first fluid passageway.

17. A turbine engine component comprising:
    a trailing edge portion;
    at least one wavy cooling passageway in said trailing edge portion;
    each said wavy cooling passageway having a first non-linear sidewall and a second non-linear sidewall;
    each said sidewall having a plurality of spaced apart peaks and a plurality of spaced apart valleys;
    said peaks of said first sidewall being aligned with said peaks of said second sidewall to form pairs of peaks and said valleys of said first sidewall being aligned with said valleys of said second sidewall to form pairs of valleys so that said first sidewall and said second sidewall are mirror images of each other;
    said peaks in each said pair of peaks extending in a first direction and said valleys in each said pair of valleys extending in a second direction opposed to said first direction;
    each said passageway having a first cross sectional area between aligned ones of said peaks and a second cross sectional area in other regions of said passageway, and wherein said second cross sectional area is greater than said first cross sectional area;
    said first cross sectional area being no more than equal to a cross sectional area at aligned ones of said valleys;
    each said wavy cooling passageway having an inlet for receiving a cooling fluid; and
    an exit nozzle for discharging said cooling fluid.

18. A turbine engine component according to claim 17, further comprising a plurality of wavy cooling passageways in said trailing edge portion.

19. A turbine engine component according to claim 17, wherein each of said wavy cooling passageways has said first and second sidewalls and said first and second sidewalls being spaced apart by a distance which allows cooling fluid to fill the cooling passageways and flow along a non-linear path.

20. A turbine engine component according to claim 17, wherein each said cooling passageway extends in a radial direction.

21. A method for manufacturing a turbine engine component comprising the steps of:
   casting a turbine engine component having a pressure side and a suction side, each with an external wall and an internal wall;
   said casting step further comprising forming a first set of wavy fluid passageways between said external wall and said internal wall on said pressure side, and a second set of wavy fluid passageways between said external wall and said internal wall on said suction side; and
   each said wavy fluid passageway forming step comprising forming each said wavy passageway to have a plurality of regions of maximum width and further comprising drilling at least one film cooling hole in each of said regions of maximum width.

22. A method according to claim 21, wherein said drilling step comprises laser drilling each of said film cooling holes.

23. A method according to claim 21, wherein said wavy passageway forming step comprises forming each passageway so that each said maximum width region has a width in the range of from 0.085 inches to 0.125 inches.

24. A method according to claim 21, wherein said wavy passageway forming step comprises forming each passageway to have a minimum width region having a width in the range of from 0.055 to 0.065 inches.

25. A method according to claim 21, wherein said wavy passageway forming step comprises forming a plurality of wavy ribs between said passageways.

26. A method according to claim 21, wherein said rib forming step comprises forming ribs having a width in the range of from 0.025 to 0.035 inches.

27. A method according to claim 21, wherein said casting step further comprises forming at least one trailing edge fluid passageway having a wavy configuration in a trailing edge portion.

28. A method according to claim 27, wherein said casting step further comprising forming a plurality of radially extending trailing edge fluid passageways having said wavy configuration in said trailing edge portion.

29. A method according to claim 27, wherein said trailing edge fluid passageway forming step comprises forming at least one wavy trailing edge passageway having a first sidewall with a plurality of spaced apart peaks and valleys and a second sidewall with a plurality of spaced apart peaks and valleys.

30. A method according to claim 29, wherein said trailing edge fluid passageway forming step comprises spacing said first sidewall and said second sidewall so that a cooling fluid fills said trailing edge fluid passageway and travels along a non-linear path.

31. A method according to claim 30, wherein said spacing step comprises spacing said first sidewall from said second sidewall so that said trailing edge fluid passageway has a first cross sectional area between aligned ones of said peaks and a second cross sectional area in other regions of said passageway with said second cross sectional area being greater than said first cross sectional area.

32. A method according to claim 27, wherein said casting step further comprises casting a fluid passageway for supplying a cooling fluid to said at least one trailing edge fluid passageway and forming at least one exit nozzle which communicates with said at least one trailing edge fluid passageway.

33. A method for manufacturing a turbine engine component comprising the steps of:
   casting a turbine engine component having an airfoil portion with a leading edge and a trailing edge; and
   forming a plurality of trailing edge fluid passageways having a wavy configuration in a trailing edge portion of said airfoil portion; and
   said forming step comprising forming each trailing edge fluid passageway with a first non-linear sidewall having a plurality of spaced apart peaks and a plurality of spaced apart valleys and a second sidewall with a plurality of spaced apart peaks and a plurality of spaced apart valleys and forming said first and second sidewalls as a mirror image so that said peaks and valleys of said first sidewall are aligned with said peaks and valleys of said second sidewall to form pairs of peaks which extend in a first direction and pairs of valleys which extend in a second direction opposed to said first direction;
   wherein said trailing edge fluid passageway forming step comprises spacing said first sidewall and said second sidewall so that a cooling fluid fills said trailing edge fluid passageway and travels along a non-linear path; and wherein said spacing step comprises spacing said first sidewall from said second sidewall so that said trailing edge fluid passageway has a first cross sectional area between aligned ones of said peaks, a second cross sectional area in other regions of said passageway, and a third cross sectional area between aligned one of said valleys; and wherein said second cross sectional area being greater than said first cross sectional area and said first cross sectional area being no more than said third cross sectional area.

34. A method according to claim 33, wherein said casting step further comprises casting a fluid passageway for supplying a cooling fluid to said at least one trailing edge fluid passageway and forming at least one exit nozzle which communicates with said at least one trailing edge fluid passageway.

* * * * *